US010979289B2

United States Patent
Sidhartha et al.

(10) Patent No.: US 10,979,289 B2
(45) Date of Patent: Apr. 13, 2021

(54) APPARATUSES AND METHODS FOR REMOTE COMPUTING NODE REGISTRATION AND AUTHENTICATION

(71) Applicant: Nutanix, Inc., San Jose, CA (US)

(72) Inventors: Kumar Sidhartha, Bangalore (IN); Monica Adusumilli, Vjayawada (IN); Toms Varghese, Thiruvalla (IN)

(73) Assignee: Nutanix, Inc., San Jose, CA (US)

( * ) Notice: Subject to any disclaimer, the term of this patent is extended or adjusted under 35 U.S.C. 154(b) by 0 days.

(21) Appl. No.: 16/681,628

(22) Filed: Nov. 12, 2019

(65) Prior Publication Data

US 2021/0051062 A1 Feb. 18, 2021

Related U.S. Application Data

(60) Provisional application No. 62/885,758, filed on Aug. 12, 2019.

(51) Int. Cl.
*G06F 15/177* (2006.01)
*H04L 12/24* (2006.01)
*H04L 29/06* (2006.01)
*H04L 29/12* (2006.01)

(52) U.S. Cl.
CPC ...... *H04L 41/0806* (2013.01); *H04L 61/2015* (2013.01); *H04L 63/0428* (2013.01)

(58) Field of Classification Search
CPC ............ H04L 41/0806; H04L 61/2015; H04L 63/0428
USPC .................................................. 709/203, 222
See application file for complete search history.

(56) References Cited

U.S. PATENT DOCUMENTS

| | | |
|---|---|---|
| 7,920,549 B2 | 4/2011 | Alt et al. |
| 8,429,276 B1 | 4/2013 | Kumar et al. |
| 8,549,518 B1 | 10/2013 | Aron et al. |
| 8,601,473 B1 | 12/2013 | Aron et al. |
| 8,656,018 B1 | 2/2014 | Keagy et al. |
| 8,726,274 B2 | 5/2014 | Pafumi et al. |
| 8,850,130 B1 | 9/2014 | Aron et al. |
| 8,863,124 B1 | 10/2014 | Aron |
| 9,009,106 B1 | 4/2015 | Aron et al. |
| 9,069,708 B2 | 6/2015 | Gill et al. |

(Continued)

OTHER PUBLICATIONS

U.S. Appl. No. 16/689,870 titled "Apparatuses and Methods for Remote Computing Node Initialization Using a Configuration Template and Resource Pools" filed Nov. 20, 2019, pp. all.

(Continued)

*Primary Examiner* — Duyen M Doan
(74) *Attorney, Agent, or Firm* — Dorsey & Whitney LLP

(57) ABSTRACT

A computing node is configured to initialize by requesting a particular network resource from a network management server, and receiving acknowledgment of the particular network resource and an encryption key from the network management server to contact a configuration management server. The initialization further includes providing, using the particular network resource, a registration request message encrypted based on the encryption key to the configuration management server, and receiving configuration information corresponding to the computing node from the configuration management server in response to the registration request computing node.

23 Claims, 6 Drawing Sheets

(56) References Cited

U.S. PATENT DOCUMENTS

| | | | |
|---|---|---|---|
| 9,152,447 | B2 | 10/2015 | Venkat et al. |
| 9,336,132 | B1 | 5/2016 | Aron et al. |
| 9,426,030 | B1 | 8/2016 | Anerousis et al. |
| 9,652,265 | B1 | 5/2017 | Narayanasamy et al. |
| 9,747,287 | B1 | 8/2017 | Bhardwaj et al. |
| 9,772,866 | B1 | 9/2017 | Aron et al. |
| 10,191,757 | B2 | 1/2019 | Venkataramaiah et al. |
| 10,284,642 | B2 | 5/2019 | Shanley et al. |
| 2005/0169195 | A1* | 8/2005 | Luo .................... H04L 61/2015 370/254 |
| 2006/0143432 | A1 | 6/2006 | Rothman et al. |
| 2006/0155674 | A1 | 7/2006 | Traut et al. |
| 2010/0017597 | A1* | 1/2010 | Chandwani ......... H04L 61/2015 713/156 |
| 2011/0075591 | A1 | 3/2011 | Cheshire |
| 2012/0150985 | A1 | 6/2012 | Marion et al. |
| 2012/0207291 | A1 | 8/2012 | West et al. |
| 2013/0227144 | A1 | 8/2013 | Saito et al. |
| 2013/0287026 | A1 | 10/2013 | Davie |
| 2014/0156824 | A1 | 6/2014 | Biswas et al. |
| 2015/0096011 | A1 | 4/2015 | Watt |
| 2015/0134791 | A1 | 5/2015 | Cohn et al. |
| 2015/0271014 | A1 | 9/2015 | Madama |
| 2015/0341189 | A1 | 11/2015 | Zhang et al. |
| 2015/0363724 | A1 | 12/2015 | Chatterjee et al. |
| 2015/0365323 | A1 | 12/2015 | Duminuco et al. |
| 2016/0006607 | A1 | 1/2016 | Wang et al. |
| 2016/0212044 | A1 | 7/2016 | Danforth |
| 2016/0255045 | A1 | 9/2016 | Kolesnik et al. |
| 2017/0223053 | A1* | 8/2017 | Dhanabalan ........ H04L 63/1408 |
| 2018/0129524 | A1 | 5/2018 | Bryant et al. |
| 2018/0367530 | A1* | 12/2018 | Mistry ................ H04L 65/1069 |
| 2018/0375921 | A1 | 12/2018 | Wang et al. |
| 2019/0166032 | A1 | 5/2019 | Inbaraj et al. |
| 2019/0356541 | A1 | 11/2019 | Finn et al. |
| 2020/0044917 | A1* | 2/2020 | Peng .................. H04L 41/0809 |

OTHER PUBLICATIONS

Abhilash, G. B. "VMware vSphere 5.5 Cookbook", Packt Publishing, Limited, Olton Birmingham, Feb. 27, 2015, pp. all.

Cano, Ignacio et al. "Curator: Self-Managing Storage for Enterprise Clusters"; University of Washington; published Mar. 2017; pp. all.

U.S. Appl. No. 15/980,321 titled "Apparatuses and Methods for Zero Touch Computing Node Initialization" filed May 15, 2018, pp. all.

Poitras, Steven. "The Nutanix Bible" (Jan. 11, 2014), from http://stevenpoitras.com/the-nutanix-bible/ (Publication date based on indicated capture date by Archive.org; first publication date unknown), pp. all.

Poitras, Steven. "The Nutanix Bible" (Jan. 12, 2016), from https://nutanixbible.com/ pp. all.

Poitras, Steven. "The Nutanix Bible" (Oct. 15, 2013), from http://stevenpoitras.com/the-nutanix-bible/ (Publication date based on indicated capture date by Archive.org; first publication date unknown), pp. all.

Poitras, Steven, "The Nutanix Bible" (Jun. 20, 2014), from http://stevenpoitras.com/the-nutanix-bible/ (Publication date based on indicated capture date by Archive.org; first publication date unknown), pp. all.

Poitras, Steven. "The Nutanix Bible" (Jun. 25, 2018), from https://nutanixbible.com/ pp. all.

Poitras, Steven. "The Nutanix Bible" (Jan. 3, 2017), from https://nutanixbibe.com/ pp. all.

Poitras, Steven. "The Nutanix Bible" (Jan. 3, 2018), from https://nutanixbible.com/ pp. all.

Poitras, Steven. "The Nutanix Bible" (Sep. 4, 2015), from https://nutanixbible.com/ pp. all.

Poitras, Steven. "The Nutanix Bible" (Jan. 7, 2015), from http://stevenpoitras.com/the-nutanix-bible/ (Publication date based on indicated capture date by Archive.org; first publication date unknown), pp. all.

Poitras, Steven, "The Nutanix Bibie" (Jan. 8, 2019), from https://nutanixbible.com/ pp. all.

Poitras, Steven. "The Nutanix Bible" (Jun. 8, 2017), from https://nutanixbible.com/ pp. all.

Poitras, Steven. "The Nutanix Bible" (Jun. 9, 2015), from http://stevenpoitras.com/the-nutanix-bible/ (Publication date based on indicated capture date by Archive.org; first publication date unknown), pp. all.

Poitras, Steven. "The Nutanix Bible" (Jun. 9, 2016), from https://nutanixbible.com/ pp. all.

Poitras, Steven. "The Nutanix Bible" (Jul. 25, 2019), from https://nutanixbible.com/ pp. all.

Poitras, Steven. "The Nutanix Bible" (Sep. 17, 2019), from https://nutanixbible.com/ pp. all.

* cited by examiner

APPARATUSES AND METHODS FOR REMOTE COMPUTING NODE REGISTRATION AND AUTHENTICATION

CROSS REFERENCE TO RELATED APPLICATION(S)

This application claims priority to U.S. Provisional Application No. 62/885,758 filed Aug. 12, 2019, the contents of which are hereby incorporated by reference herein, in its entirety.

BACKGROUND

Many businesses maintain small information technology (IT) infrastructure installations in remote sites, like branch offices and retail stores (e.g., remote office, branch office (ROBO) sites). In some instances, businesses may reduce IT costs by maintaining a skilled IT team in one location, and remotely manage ROBO sites using the Internet or other network connectivity. Conventionally, deploying and configuring a complex distributed software application at a ROBO site requires skilled IT staff be physically present. It can be difficult and expensive to hire or temporarily deploy IT staff at ROBO sites.

DETAILED DESCRIPTION

Figure 1:
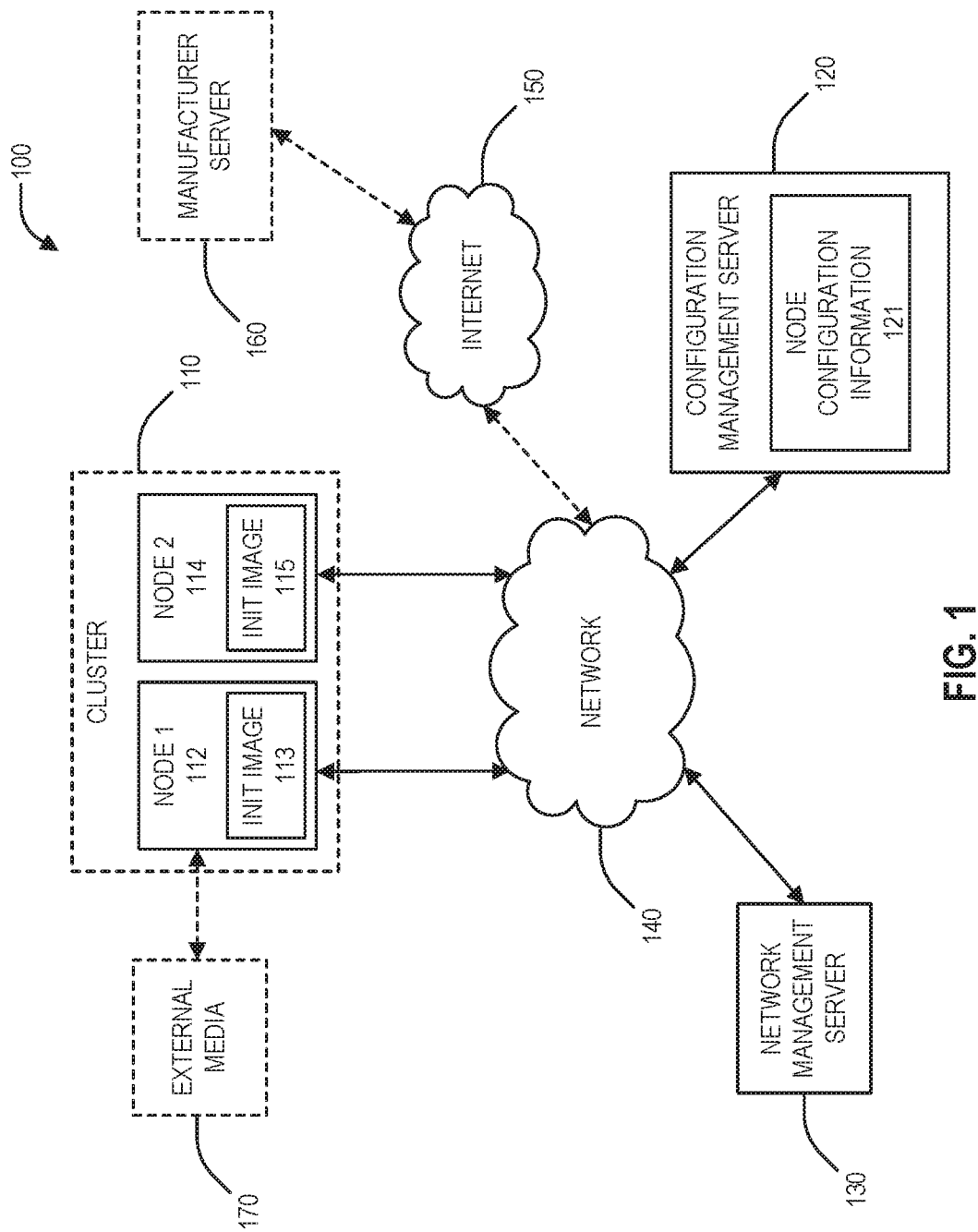
FIG. 1 is a block diagram of a wide area computing system 100, in accordance with an embodiment of the present disclosure.

This disclosure describes embodiments for registration and authentication of a computing node in a distributed computing system that is deployed at a remote site. When a computing node is initially powered on, it may be installed with an initialization application that causes the computing node to broadcast a message to request for an Internet Protocol (IP) address to connect to a network using Dynamic Host Configuration Protocol (DHCP). In some examples, the broadcast message may include an identifier associated with the computing node and/or a vendor class identifier. A network management server may respond to the broadcast message with an IP address assigned to the computing node, along with contact information for a central configuration management system. The contact information associated with the central configuration management system may include an address and/or an authentication key. In some examples, the authentication key may be an application programming interface (API) encryption key that may be used to encrypt messages sent to the central configuration management system. In some examples, the contact information associated with the central configuration management system may be encoded in vendor-encapsulated options of a DHCP message. The computing node may provide a registration request to the central configuration management system using the contact information. The registration message may be encrypted based on the authentication key, in some examples. The registration request may include an identifier associated with the computing node, such as a serial number or other identifying number. The central configuration management system may respond to the registration request with an acknowledgment message that includes registration information associated with the computing node, such as a unique identifier for the computing node. In some examples, the registration information may include authentication information specific to the computing node. The computing node may send a request to the central configuration management server for node configuration information using the received registration information. The configuration server may use identifying registration information associated with the computing node to determine an associated configuration, and may send software images and configuration information associated with the configuration of the computing node.

Various embodiments of the present disclosure will be explained below in detail with reference to the accompanying drawings. The detailed description includes sufficient detail to enable those skilled in the art to practice the embodiments of the disclosure. Other embodiments may be utilized, and structural, logical and electrical changes may be made without departing from the scope of the present disclosure. The various embodiments disclosed herein are not necessary mutually exclusive, as some disclosed embodiments can be combined with one or more other disclosed embodiments to form new embodiments.

FIG. 1 is a block diagram of a wide area computing system 100, in accordance with an embodiment of the present disclosure. The wide area computing system of FIG. 1 includes a computing node cluster 110 connected to a network management server 130 and a configuration management server 120 via a network 140. The computing nodes 112 and/or 114 may include, for example, a server computer, a laptop computer, a desktop computer, a tablet computer, a smart phone, or any other type of computing device. In some examples, the network 140 may connect to a manufacturer server 160 via the Internet 150. The network 140 may include any type of network capable of routing data transmissions from one network device (e.g., the computing server cluster 110, the configuration management server 120, the network management server 130, and/or the manufacturer server 160) to another. For example, the network 140 may include a local area network (LAN), wide area network (WAN), intranet, or a combination thereof. The network 140 may be a wired network, a wireless network, or a combination thereof.

The computing server cluster 110 may include a computing node 112 and a computing node 114. More than two computing nodes may be included in the computing node cluster 110 without departing from the scope of the disclosure. Each of the computing node 112 and computing node 114 may include an initialization application/service 113 and an initialization application/service 115, respectively. The computing node 112 and the computing node 114 may work together within the computing node cluster 110 to perform a function, such as a distributed file server, a backup system, etc. In some examples, the computing node 112 may be a primary computing node and the computing node 114 may be secondary computing node. The computing node 112 and the computing node 114 may be applied to other use cases, without departing from the scope of the disclosure. Because the computing node 112 and the computing node 114 of the computing node cluster 110 may perform different functions for different installations, each of the computing node 112 and the computing node 114 include software and firmware, support permissions, contracts, assigned policies, and update procedures specific to the application. Further, operation of the computing node 112 and the computing node 114 may rely on a level of compatibility between software builds to facilitate successful communication between the computing node 112 and the computing node 114, and between the computing node cluster 110 and the configuration management server 120.

To initiate loading of the software and firmware, support permissions, contracts, assigned policies, and update procedures specific to the application, the initialization applications/services 113 and/or 115 may initiate a negotiation with the network management server 130 to connect to the network 140. The negotiation may include broadcasting a DHCP discovery message requesting network resources (e.g., an offered IP address, server, gateway, and client IP addresses, lease time, DHCP server IP address, etc.). The broadcast DHCP discovery message may include an identifier specific to the computing node 112 or 114. In response to the DHCP discovery message, the computing node 112 and/or the computing node 114 may receive an offer message that includes selected and/or provided network resources. The computing node 112 or 114 may respond to the offer message with a request for the offered network resources, which may be acknowledged by the network management server. The network management server 130 may respond with an acknowledgment message that includes an assigned IP address, server, gateway, and client IP addresses, lease time, DHCP server IP address, etc.

In some examples, the initialization applications/services 113 and/or 115 may cause the computing nodes 112 and/or 114 to include a vendor class identifier in one or both of the discovery message or the request message. In response to the vendor class identifier, the network management server 130 may further include contact information associated with the configuration management server 120, such as an address and an authentication key (e.g., API encryption key) in one or both of the offer message or the acknowledgment message. The contact information associated with the configuration management server 120 may be encoded in the vendor encapsulated options of the offer and/or the acknowledgement message such that it can be decoded by the initialization applications/services 113 and/or 115.

Using the contact information and the assigned network resources, the initialization applications/services 113 and/or 115 may cause the computing nodes 112 and/or 114, respectively, to contact the configuration management server 120 to register the computing node 112 and/or the computing node 114, respectively with the configuration management server 120, in some examples. Once registered, the initialization applications/services 113 and/or 115 may contact the configuration management server 120 to request computing node configuration information for the computing node 112 and the computing node 114, respectively.

The configuration management server 120 may communicate with the computing node cluster 110 via the network 140. The configuration management server 120 operates configuration and/or infrastructure management software to manage configuration of the computing server cluster 110. The configuration management server 120 may include node configuration information 121 that provides information for computing nodes 112 and 114 of the computing node cluster 110. The node configuration information 121 may include authentication information (e.g., encryption keys), software images, firmware, network configuration settings, policies, licenses, support contracts, update procedures, any combination thereof, etc. When initially contacted by the computing node 112 or the computing node 114, the configuration management server may select the node configuration information 121 to provide to the computing node 112 or the computing node 114 based on one or more identifiers model numbers, IP addresses, MAC addresses, serial numbers, etc.) associated with the computing node 112 or the computing node 114. The configuration management server 120 may provide the selected the node configuration information 121 to the computing node 112 or the computing node 114 load operational software based on the node configuration information 121.

The network management server 130 may be a discrete hardware component or device, or may be distributed in one or more other devices connected to the network 140, such as the configuration management server 120. The network management server 130 may include a DHCP server that uses DHCP to manage network resources (e.g., an offered IP address, server, gateway, and client IP addresses, lease time, DHCP server IP address, etc.) for the network 140, including selecting network resources and logging requests for network resources to provide indications of overlap. As part of the DHCP, the network management server 130 may provide information for connection to the configuration management server 120 via specified fields in DHCP messages. The specified fields may include vendor encapsulated options of the DHCP messages. At least some of the allocated network resources and/or the information for connection to the configuration management server may be sent in response to a vendor class identifier or other identifier included in the broadcast message from the computing node 112 and/or the computing node 114. The connection information provided by the network management server 130 may include at least a host identifier associated with the configuration management server 130 and/or an encryption key (e.g., API encryption key). The computing nodes 112 and 114 may attempt to register with the configuration management server 120 using the host identifier. In some examples, the registration request may be encrypted using the encryption key.

In some examples, initialization of the computing nodes 112 and 114 may be managed by the manufacturer server 160 via the internet 150. The manufacturer server 160 may store the node configuration information 121, and may select the node configuration information based on the one or more identifiers associated with the computing nodes 112 and 114.

In operation, the computing node cluster 110 may be in physically remote location from the configuration management server 120. Conventional installation of the computing node cluster 110 may be difficult and/or expensive, as options may include hiring personnel to be physically present to manage the computing node cluster 110, or sending existing personnel to the computing node cluster 110 to manage the computing node cluster 110. To mitigate the conventional expense, the computing nodes 112 and 114 running the initialization applications/services 113 and 115, respectively, may contact and communicate with the configuration management server 120 to facilitate transfer of the node configuration information 121, which may include authentication information (e.g., encryption keys), selected software images, support contracts, licenses, assigned policies, update procedures, marketing information, etc., to each of the computing node 112 and the computing node 114 for installation. In some examples, if the computing nodes 112 or 114 are not loaded with images for the initialization application/services 113 or 115, the computing nodes 112 or 114 may load the images to load and boot the initialization application/services 113 or 115 from the external media 170.

Initially, to connect to the network 140, the initialization applications/services 113 and 115 may cause the computing nodes 112 and 114, respectively, to broadcast a discovery message to request for network resources. The broadcast discovery message may include an identifier specific to the computing node 112 or 114. The broadcast discovery message may be transmitted using DHCP.

In response to the broadcast discovery message, the network configuration manager 130 may select network resources to offer to the computing node 112 or 114 and may provide an offer message to the computing node 112 or 114 that includes the selected network resources (e.g., an offered IP address, server, gateway, and client IP addresses, lease time, DHCP server IP address, etc.).

In response to the offer message, the computing node 112 or 114 may provide a request message to the network management server 130 to request network resources. The requested network resources may be the offered network resources from the offer message, or may different network resources. The network management server 130 may respond with an acknowledgment message that includes an assigned IP address, server, gateway, and client IP addresses, lease time, DHCP server IP address, etc.

In some examples, the computing nodes 112 and/or 114 may provide a vendor class identifier in one or both of the discovery message and the request message. In response to the vendor class identifier, the network management server 130 may look up additional vendor-specific information to be provided the computing node 112 or 114 based on the vendor class identifier. The vendor-specific information may include contact information associated with the configuration management server 120, including an address, an authentication key (e.g., API encryption key), or combinations thereof. The network management server 130 may further include the contact information associated with the configuration management server 120, such as an address and an authentication key (e.g., API encryption key) in one or both of the offer message or the acknowledgment message. The contact information associated with the configuration management server 120 may be encoded in vendor encapsulated options of the offer and/or the acknowledgement message such that it can be decoded by the initialization applications/services 113 and/or 115, in some examples.

In some examples, the network management server 130 may include the contact information associated with the configuration management server 120 in one or more custom options of the offer and/or acknowledgment message, in addition to or in lieu of inclusion in the vendor encapsulated options.

Using the contact information, the computing node 112 or 114 may send a registration request message to the configuration management server 120. The message may include an API call, in some examples. The API call may be encrypted using an API encryption key provided by the network management server 130. The registration request message may include an identifier specific to the computing node 112 or 114. If the identifier matches an expected identifier, the configuration management server 120 may respond with an acknowledgment message to the computing node 112 or 114 that includes a unique identifier associated with the computing node 112 or 114 to securely communicate with the configuration management server 120. In some examples, the acknowledgment message may further include authentication information having a node-specific encryption key.

Once registered, the computing nodes 112 and 114 may communicate securely with the configuration management server 120 to receive selected node configuration information 121 for the computing nodes 112 and 114. The configuration management server 120 may transfer the node configuration information 121 to one or more of the computing nodes 112 and 114 via the network 140. In some examples where bandwidth in limited via the network 140, such as over a wide area network, the configuration management server 120 may designate one of the computing nodes 112 or 114 as a primary computing node, and may transfer the node configuration information 121 to the primary computing node. The primary computing node may manage transfer of the node configuration information 121 over a local area network to the other computing node 112 or 114. After the computing nodes 112 or 114 are loaded with the node configuration information, the computing nodes 112 or 114 may be brought online and into service. In another example where bandwidth is limited over the network 140, the configuration management server 120 may direct the computing node 112 (or 114) to retrieve the node configuration information from an external media source 170, such as a portable flash drive connected via a universal serial bus (USB) port.

Figure 2:
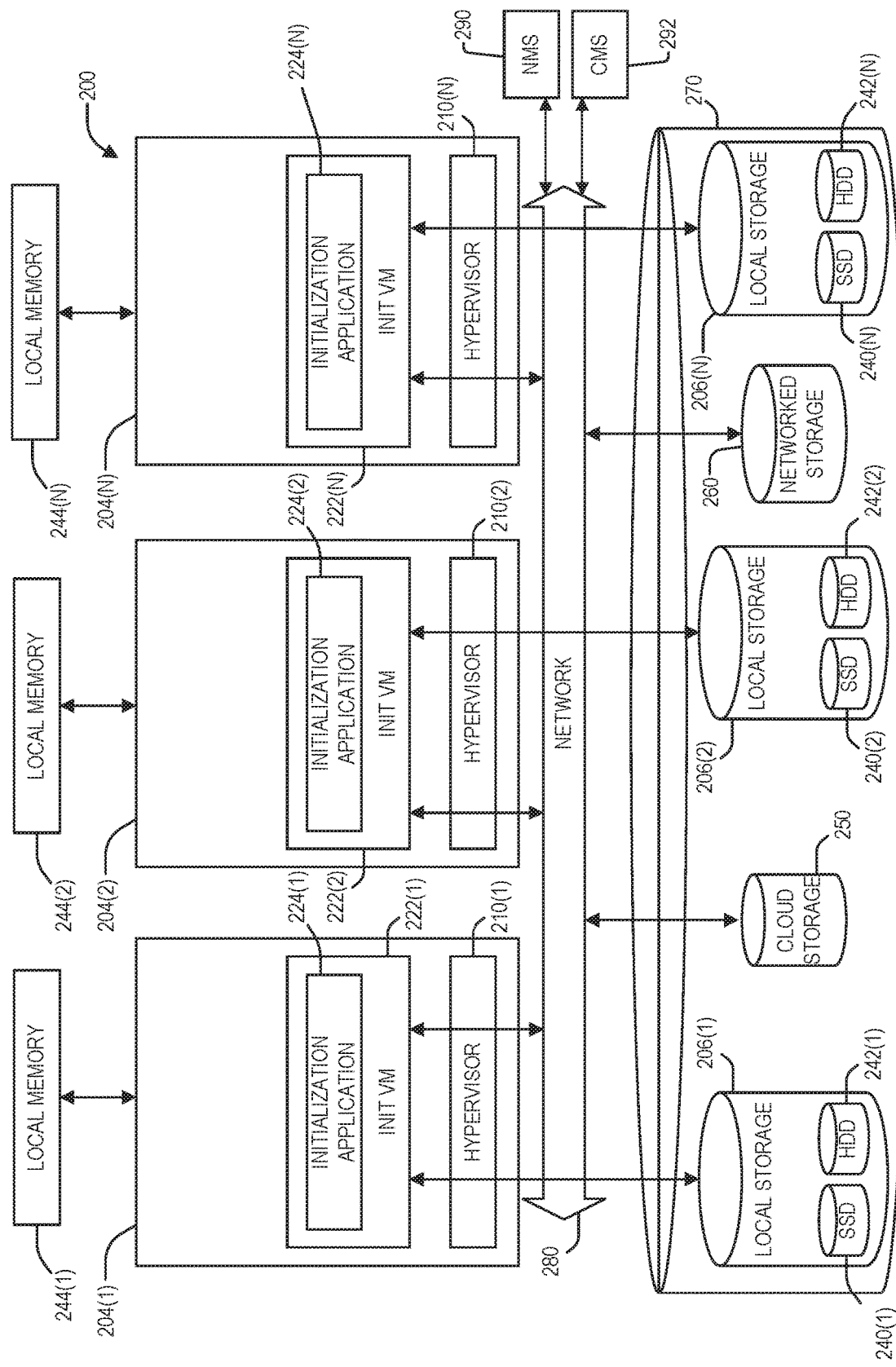
FIG. 2 is a block diagram of a distributed computing system 200 prior to initialization, in accordance with an embodiment of the present disclosure.

FIG. 2 is a block diagram of a distributed computing system 200 prior to initialization, in accordance with an embodiment of the present disclosure. The distributed computing system of FIG. 2 generally includes computing nodes 204(1)-(N) and storage 270 connected to a network 280. While FIG. 2 depicts three computing nodes, the distributed computing system 200 may include two or more than three computing nodes without departing from the scope of the disclosure. The network 280 may be any type of network capable of routing data transmissions from one network device (e.g., computing nodes 204(1)-(N) and storage 270) to another. For example, the network 280 may be a local area network (LAN), wide area network (WAN), intranet, Internet, or a combination thereof. The network 280 may be a wired network, a wireless network, or a combination thereof.

The storage 270 may include local storage 206(1)-(N), cloud storage 250, and networked storage 260. The local storage 206(1)-(N) may include, for example, one or more solid state drives (SSDs 240(1)-(N)) and one or more hard disk drives (HDD 242(1)-(N)). The local storage 206(1)-(N) may be directly coupled to, included in, and/or accessible by a respective computing nodes 204(1)-(N) without communicating via the network 280. The cloud storage 250 may include one or more storage servers that may be stored remotely to the computing nodes 204(1)-(N) and accessed via the network 280. The cloud storage 250 may generally include any type of storage device, such as HDDs SSDs, or optical drives. The networked storage 260 may include one or more storage devices coupled to and accessed via the network 280. The networked storage 260 may generally include any type of storage device, such as HDDs SSDs, or optical drives. In various embodiments, the networked storage 260 may be a storage area network (SAN). The computing node 202 is a computing device for hosting VMs in the distributed computing system 200 of FIG. 2. The computing node 202 may be, for example, a server computer, a laptop computer, a desktop computer, a tablet computer, a smart phone, or any other type of computing device. The computing node 202 may include one or more physical computing components, such as processors.

Each of the computing nodes 204(1)-(N) may include a computing device configured to host a respective hypervisor 210(1)-(N) and an 222(1)-(N) that executes a respective initialization service/application 224(1)-(N). In some examples, the 222(1)-(N) may execute on the physical computing node without the respective hypervisor 210(1)-(N). For example, each of the computing nodes 204(1)-(N) may be or include a server computer, a laptop computer, a desktop computer, a tablet computer, a smart phone, any other type of computing device, or any combination thereof. Each of the computing nodes 204(1)-(N) may include one or more physical computing components, such as one or more processor units, respective local memory 244(1)-(N) (e.g., cache memory, dynamic random-access memory (DRAM), non-volatile memory (e.g., flash memory, etc.), portable memory connected via I/O ports, or combinations thereof), the respective local storage 206(1)-(N), ports (not shown) to connect to peripheral input/output (I/O) devices (e.g., touchscreens, displays, speakers, keyboards, mice, cameras, microphones, environmental sensors, etc.).

Each of the hypervisors 210(1)-(N) may include any type of hypervisor. For example, each of the hypervisors 210(1)-(N) may include an ESX, an ESX(i), a Hyper-V, a KVM, or any other type of hypervisor. Each of the hypervisors 210(1)-(N) may manage the allocation of physical resources (e.g., physical processor units, volatile memory, the storage 270) to respective hosted components (e.g., 222(1)-(N)) and performs various VM and/or container related operations, such as creating new VMs and/or containers, cloning existing VMs and/or containers, etc. Each type of hypervisor may have a hypervisor-specific API through which commands to perform various operations may be communicated to the particular type of hypervisor. The commands may be formatted in a manner specified by the hypervisor-specific API for that type of hypervisor. For example, commands may utilize a syntax and/or attributes specified by the hypervisor-specific API. Collectively, the hypervisors 210(1)-(N) may all include a common hypervisor type, may all include different hypervisor types, or may include any combination of common and different hypervisor types.

During operation, the computing nodes 204(1)-(N) may be initially loaded with the 222(1)-(N) that each executes the respective initialization service/application 224(1)-(N). On an initial power up, each respective the respective initialization service/application 224(1)-(N) may be configured to facilitate connection to the network 280 and to initiate registration and authentication with a configuration management server 292 to receive node configuration information for the installed application or implementation. For example, the computing nodes 204(1)-(N) may receive and load node configuration information that sets up the computing nodes 204(1)-(N) as nodes of a cluster for a distributed file system or a backup file system or a disaster recovery system.

Contact information for the configuration management server 292 may be handled via communication with a network management server 290 to connect to the network 180. For example, the initialization applications/services 224(1)-(N) may contact the network management server 290 to negotiate network resources associated with the network 280, as well as receive the contact information associated with the configuration management server 292 via specific fields of one or more of the DHCP messages (e.g., the offer and/or acknowledgement messages). Initially, each initialization applications/service 224(1)-(N) may broadcast a discovery message to negotiate access to network resources of the network 280 with the network management server 290. The discovery message may include an identifier associated with the respective computing node 204(1)-(N). The network management server 290 may respond with an offer message that includes offered network resources (e.g., an IP address, server, gateway, and client IP addresses, lease time, DHCP server IP address, etc.).

In response to the offer message, each initialization applications/service 224(1)-(N) may provide a request message to the network management server 290 to request network resources. The requested network resources may be the offered network resources from the offer message, or may different network resources. The network management server 290 may respond with an acknowledgment message that includes an assigned IP address, server, gateway, and client IP addresses, lease time, DHCP server IP address, etc.

In some examples, each initialization applications/service 224(1)-(N) may provide a vendor class identifier in one or both of the discovery message and the request message. In response to the vendor class identifier, the network management server 290 may look up additional vendor-specific information to be provided the respective computing node 204(1)-(N) based on the vendor class identifier. The vendor-specific information may include contact information associated with the configuration management server 292, including an address, an authentication key (e.g., API encryption key), or combinations thereof. The network management server 290 may further include the contact information associated with the configuration management server 292, such as an address and an authentication key (e.g., API encryption key) in one or both of the offer message or the acknowledgment message. The contact information associated with the configuration management server 292 may be encoded in vendor encapsulated options of the offer and/or the acknowledgement message such that it can be decoded by the initialization applications/services 224(1)-(N), in some examples.

In some examples, the network management server 290 may include the contact information associated with the configuration management server 292 in one or more custom options of the offer and/or acknowledgment message, in addition to or in lieu of inclusion in the vendor encapsulated options.

Using the contact information, each initialization applications/service 224(1)-(N) may send a registration request message to the configuration management server 292. The message may include an API call, in some examples. The API call may be encrypted using an API encryption key provided by the network management server 290. The registration request message may include an identifier specific to each of the computing nodes 204(1)-(N). If the identifier matches an expected identifier, the configuration management server 292 may respond with an acknowledgment message to the computing nodes 204(1)-(N) that includes a unique identifier to securely communicate with the configuration management server 292. In some examples, the acknowledgment message may further include authentication information having a node-specific encryption key.

Once registered, the initialization applications/services 224(1)-(N) may communicate securely with the configuration management server 292 to receive selected node configuration information for the computing nodes 204(1)-(N). The configuration management server 292 may transfer the node configuration information to one or more of the computing nodes 204(1)-(N) via the network 280. In some examples where bandwidth in limited via the network 280, such as over a wide area network, the configuration management server 292 may designate one of the computing nodes 204(1)-(N) as a primary computing node, and may transfer the node configuration information to the primary computing node. The primary computing node may manage transfer of the node configuration information over a local area network to other computing nodes 204(1)-(N).

In another example where bandwidth is limited over the network 280, the configuration management server 292 may direct the computing nodes 204(1)-(N) to retrieve the node configuration information from the local memory 244(1)-(N), which may include fixed memory or a portable flash drive connected via an I/O port (e.g., a universal serial bus (USB) port or some other I/O port).

Figure 3:
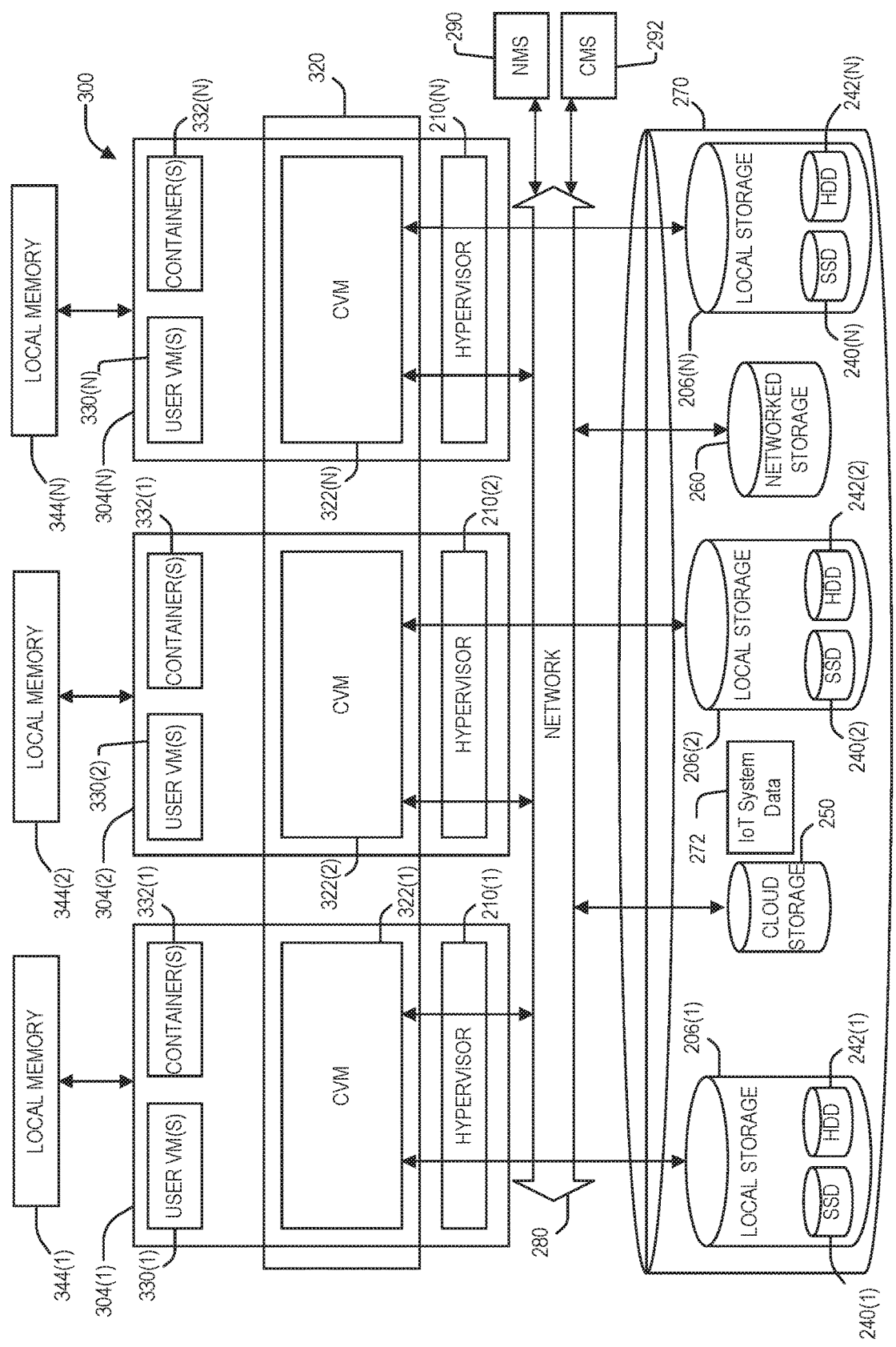
FIG. 3 is a block diagram of a distributed computing system at an intermediate step of initialization during a serial installation, in accordance with an embodiment of the present disclosure.

After the computing nodes 204(1)-(N) are loaded with the node configuration information, the computing nodes 204(1)-(N) may be brought online and into service. FIG. 3 is a block diagram of a distributed computing system 300 after initialization, in accordance with an embodiment of the present disclosure. The distributed computing system 300 may include elements that have been previously described with respect to the distributed computing system 200 of FIG. 3. Those elements have been identified in FIG. 3 using the same reference numbers used in FIG. 2 and operation of the common elements is as previously described. Consequently, a detailed description of the operation of these particular elements will not be repeated in the interest of brevity.

In addition to hosting the respective hypervisor 210(1)-(N), each of the computing nodes 204(1)-(N) may be further configured to host a respective controller virtual machine (CVM) 322(1)-(N), respective user (or guest) virtual machines (VMs) 330(1)-(N), and respective containers 332(1)-(N).

Each of the user VMs 330(1)-(N) hosted on the respective computing node includes at least one application and everything the user VM needs to execute (e.g., run) the at least one application (e.g., system binaries, libraries, etc.). Each of the user VMs 330(1)-(N) may generally be configured to execute any type and/or number of applications, such as those requested, specified, or desired by a user. Each of the user VMs 330(1)-(N) further includes a respective virtualized hardware stack (e.g., virtualized network adaptors, virtual local storage, virtual memory, processor units, etc.). To manage the respective virtualized hardware stack, each of the user VMs 330(1)-(N) is further configured to host a respective operating system (e.g., Windows®, Linux®, etc.). The respective virtualized hardware stack configured for each of the user VMs 330(1)-(N) may be defined based on available physical resources (e.g., processor units, the local memory 244(1)-(N), the local storage 206(1)-(N), etc.). That is, physical resources associated with a computing node may be divided between (e.g., shared among) components hosted on the computing node (e.g., the hypervisor 210(1)-(N), the CVM 322(1)-(N), other user VMs 330(1)-(N), the containers 332(1)-(N), etc.), and the respective virtualized hardware stack configured for each of the user VMs 330(1)-(N) may reflect the physical resources being allocated to the user VM. Thus, the user VMs 330(1)-(N) may isolate an execution environment my packaging both the user space (e.g., application(s), system binaries and libraries, etc.) and the kernel and/or hardware (e.g., managed by an operating system). While FIG. 3 depicts the computing nodes 204(1)-(N) each having multiple user VMs 330(1)-(N), a given computing node may host no user VMs or may host any number of user VMs.

Rather than providing hardware virtualization like the user VMs 330(1)-(N), the respective containers 332(1)-(N) may each provide operating system level virtualization. Thus, each of the respective containers 332(1)-(N) is configured to isolate the user space execution environment (e.g., at least one application and everything the container needs to execute (e.g., run) the at least one application (e.g., system binaries, libraries, etc.)) without requiring an operating system to manage hardware. Individual ones of the containers 332(1)-(N) may generally be provided to execute any type and/or number of applications, such as those requested, specified, or desired by a user. Two or more of the respective containers 332(1)-(N) may run on a shared operating system, such as an operating system of any of the hypervisor 210(1)-(N), the CVM 322(1)-(N), or other user VMs 330(1)-(N). In some examples, an interface engine may be installed to communicate between a container and an underlying operating system. While FIG. 3 depicts the computing nodes 204(1)-(N) each having multiple containers 332(1)-(N), a given computing node may host no containers or may host any number of containers.

As previously described, each of the hypervisors 210(1)-(N) may manage the allocation of physical resources (e.g., physical processor units, volatile memory, the storage 270) to respective hosted components (e.g., CVMs 322(1)-(N), respective user VMs 330(1)-(N), respective containers 332(1)-(N)) and performs various VM and/or container related operations, such as creating new VMs and/or containers, cloning existing VMs and/or containers, etc.

The CVMs 322(1)-(N) may provide services for the respective hypervisors 210(1)-(N), the respective user VMs 330(1)-(N), and/or the respective containers 332(1)-(N) hosted on a respective computing node of the computing nodes 204(1)-(N). For example, each of the CVMs 322(1)-(N) may execute a variety of software and/or may serve the I/O operations for the respective hypervisor 210(1)-(N), the respective user VMs 330(1)-(N), and/or the respective containers 332(1)-(N) hosted on the respective computing node 204(1)-(N). The CVMs 322(1)-(N) may communicate with one another via the network 280. By linking the CVMs 322(1)-(N) together via the network 280, a distributed network (e.g., cluster, system, etc.) of the computing nodes 204(1)-(N) may be formed. In an example, the CVMs 322(1)-(N) linked together via the network 280 may form a distributed computing environment (e.g., a distributed virtualized file server) 220 configured to manage and virtualize the storage 270. In some examples, a SCSI controller, which may manage the SSD devices 240(1)-(N) and/or the HDD devices 242(1)-(N) described herein, may be directly passed to the respective CVMs 322(1)-(N), such as by leveraging a VM-Direct Path. In the case of Hyper-V, the SSD devices 240(1)-(N) and/or the HDD devices 242(1)-(N) may be passed through to the respective CVMs 322(1)-(N).

The CVMs 322(1)-(N) may coordinate execution of respective services over the network 280, and the services running on the CVMs 322(1)-(N) may utilize the local memory 244(1)-(N) to support operations. The local memory 244(1)-(N) may be shared by components hosted on the respective computing node 204(1)-(N), and use of the respective local memory 244(1)-(N) may be controlled by the respective hypervisor 210(1)-(N). Moreover, multiple instances of the same service may be running throughout the distributed system 300. That is, the same services stack may be operating on more than one of the CVMs 322(1)-(N). For example, a first instance of a service may be running on the CVM 222(1), a second instance of the service may be running on the CVM 222(2), etc.

Figure 4:
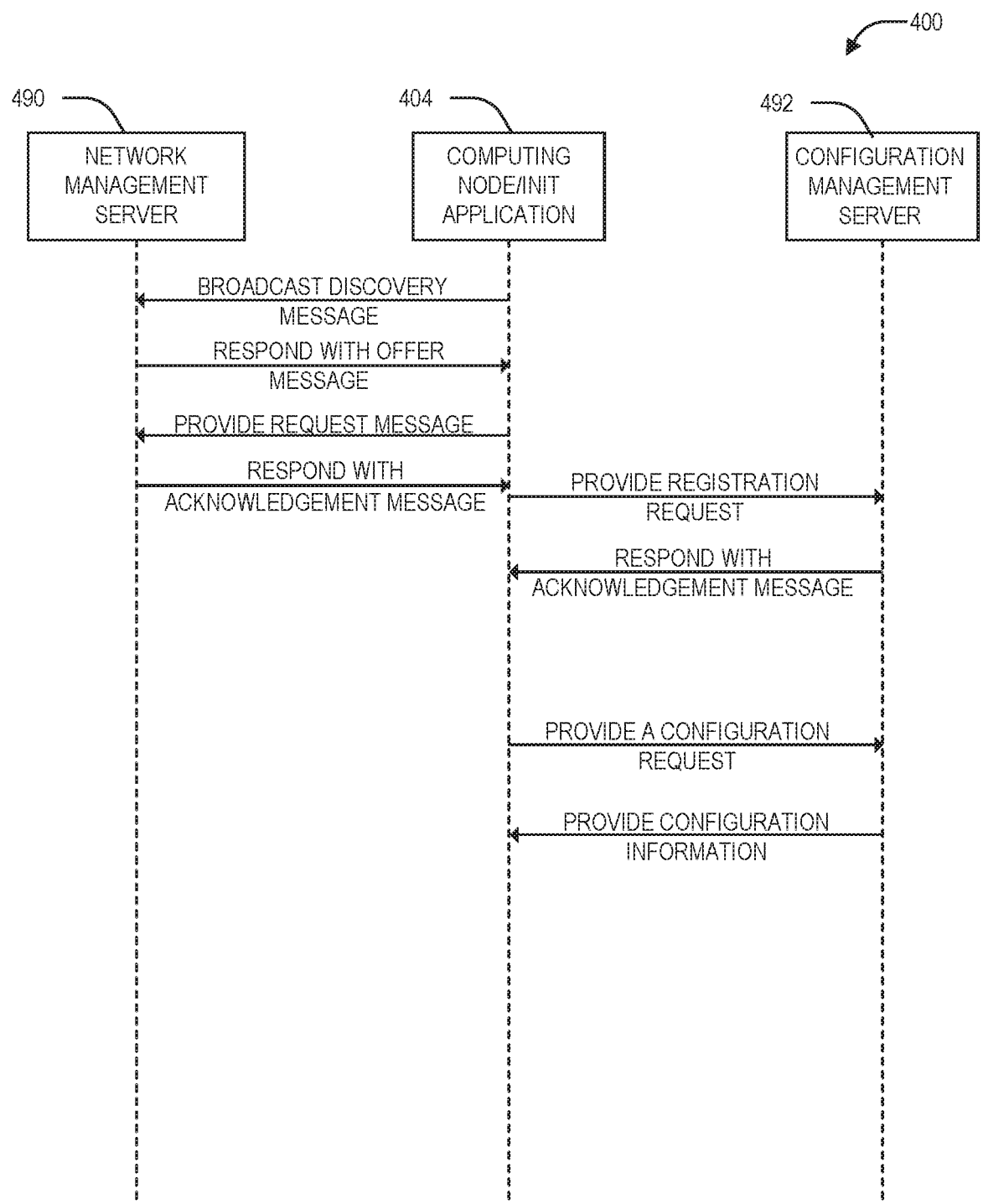
FIG. 4 is a sequence diagram to register and authenticate a deployed computing node, in accordance with an embodiment of the present disclosure.

FIG. 4 is a sequence diagram 400 to register and authenticate a deployed computing node, in accordance with an embodiment of the present disclosure. The sequence diagram of FIG. 4 may be performed via the system 100 of FIG. 1, the system 200 of FIG. 2, and/or the system 300 of FIG. 3. The sequence diagram may include a network management server 490, a computing node/initialization application 404, and a configuration management server 492. The network management server 130 of FIG. 1 and/or the network management server 290 of FIGS. 2 and 3 may implement the network management server 490. Either of the computing nodes 112 and 114 of FIG. 1 and/or any of the computing nodes 204(1)-(N) of FIGS. 2 and 3 may implement the computing node/initialization application 404. The configuration management server 120 of FIG. 1 and/or the configuration management server 292 of FIGS. 2 and 3 may implement the network management server 490. In some examples, the messages transmitted between the computing node/initialization application 404 and the network management server 490 may follow DHCP.

Initially, to connect to a network, the computing node/initialization application 404 may broadcast a discovery message to request for network resources. The broadcast discovery message may include an identifier specific to the computing node/initialization application 404.

In response to the broadcast discovery message, the network management server 490 may select network resources to offer to the computing node/initialization application 404 and may provide an offer message to the computing node/initialization application 404 that includes the selected network resources (e.g., an offered IP address, server, gateway, and client IP addresses, lease time, DHCP server IP address, etc.).

In response to the offer message, the computing node/initialization application 404 may provide a request message to the network management server 490 to request network resources. The requested network resources may be the offered network resources from the offer message, or may different network resources. The network management server 490 may respond with an acknowledgment message that includes an assigned IP address, server, gateway, and client IP addresses, lease time, DHCP server IP address, etc.

In some examples, the computing node/initialization application 404 may provide a vendor class identifier in one or both of the discovery message and the request message. In response to the vendor class identifier, the network management server 490 may look up additional vendor-specific information to be provided the computing node/initialization application 404 based on the vendor class identifier. The vendor-specific information may include contact information associated with the configuration management server 492, including an address, an authentication key (e.g., API encryption key), or combinations thereof. The network management server 490 may further include the contact information associated with the configuration management server 492, such as an address and an authentication key (e.g., API encryption key) in one or both of the offer message or the acknowledgment message. The contact information associated with the configuration management server 492 may be encoded in vendor encapsulated options of the offer and/or the acknowledgement message such that it can be decoded by the computing node/initialization application 404, in some examples.

Using the contact information, the computing node/initialization application 404 may send a registration request message to the configuration management server 492. The message may include an API call, in some examples. The API call may be encrypted using an API encryption key provided by the network management server 490. The registration request message may include an identifier specific to the computing node/initialization application 404. If the identifier matches an expected identifier, the configuration management server 492 may respond with an acknowledgment message to the computing node/initialization application 404 that includes a unique identifier to securely communicate with the configuration management server 492. In some examples, the acknowledgment message may further include authentication information having a node-specific encryption key.

Once registered, the computing node/initialization application 404 may communicate securely with the configuration management server 492 to receive selected node configuration information for the computing node/initialization application 404. The computing node/initialization application 404 may provide a request for the node configuration information to the configuration management server 492. The configuration management server 492 may respond by transferring the node configuration information to the computing node/initialization application 404.

Figure 5:
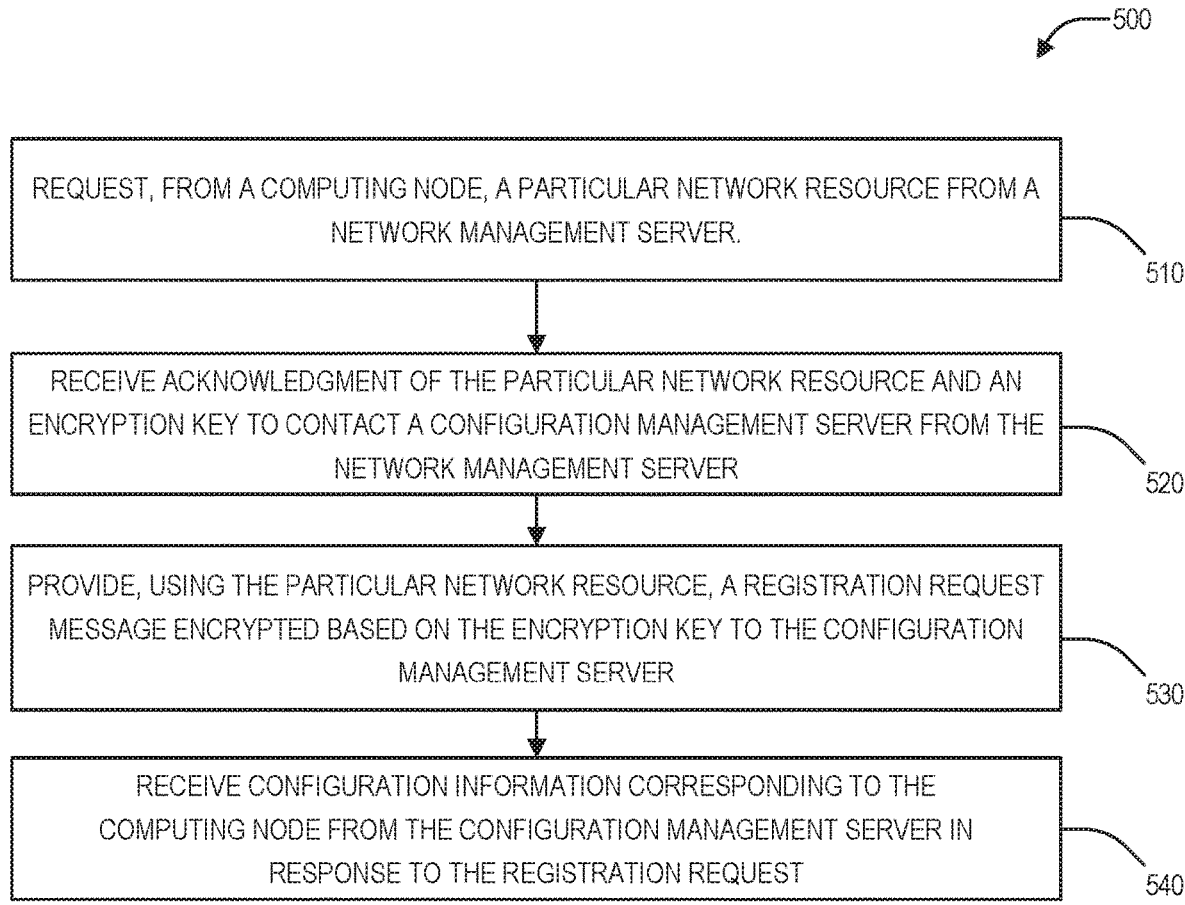
FIG. 5 is a flow diagram illustrating a method for initializing computing nodes of a computing node cluster in accordance with an embodiment of the present disclosure.

FIG. 5 is a flow diagram illustrating a method 500 for initializing a computing node of in accordance with an embodiment of the present disclosure. The method 500 may be performed by either of the computing nodes 112 and 114 of FIG. 1, any of the computing nodes 204(1)-(N) of FIGS. 2 and 3, the computing node/initialization application 404 of FIG. 4, or any combination thereof.

The method 500 may include requesting, from a computing node, a particular network resource from a network management server, at 510. The network management server may include the network management server 130 of FIG. 1, the network management server 290 of FIGS. 2 and 3, and/or the network management server 490 of FIG. 4. The network management server may implement DHCP. The particular network resource may include an IP address, server, gateway, and client IP addresses, lease time, DHCP server IP address, etc. In some examples, the particular network resource may include a resource associated with a network, such as the network 140 of FIG. 1 and/or the network 280 of FIGS. 2 and 3. In some examples, the network may include a wide area network, a local area network, or combinations thereof.

In some examples, the method 500 may include sending a dynamic host configuration protocol (DHCP) request message to the network management server to request the particular network resource. In some examples, the method 500 may include requesting the particular network resource from the network management server in response to receipt of an offer message from the network management server that included the particular network resource. In some examples, the method 500 may include, prior to receiving the offer message, broadcasting, from the computing node, a discovery message that includes an identifier associated with the computing node to request a network resource. The identifier may include at least one of a model number, a serial number, or a media access control address.

The method 500 may further include receiving acknowledgment of the particular network resource and an encryption key to contact a configuration management server from the network management server, at 520. The configuration management server may include the configuration management server 120 of FIG. 1, the configuration management server 292 of FIGS. 2 and 3, and/or the configuration management server 492 of FIG. 4. In some examples, the method 500 may further include providing the vendor class identifier to the network management server from the computing node with the request for the particular network resource. In some examples, the method 500 may further include receiving the encryption key based on the vendor class identifier provided by the computing node. In some examples, the method 500 may further include retrieving the encryption key from a vendor encapsulated option field of a dynamic host configuration protocol (DHCP) acknowledgment message. In some examples, the method 500 may further include retrieving a contract address for the configuration management server from a second vendor encapsulated option field of the DHCP acknowledgment message.

The method 500 may further include sending, using the particular network resource, a registration request message encrypted based on the encryption key to the configuration management server, at 530. In some examples, the method 500 may include providing an application programming interface call to provide the registration request message. In some examples, the encryption key is an API encryption key corresponding to the configuration management server. The identifier may include at least one of a model number, a serial number, or a media access control address. The registration request may include an identifier associated with the computing node, such as a model number, a serial number, or a media access control address.

The method 500 may further include receiving configuration information corresponding to the computing node from the configuration management server in response to the registration request, at 540. In some examples, the authentication information may include encryption keys or other security information. In some examples, the configuration information may include software and firmware, support permissions, contracts, assigned policies, and update procedures specific to the application. In some examples, the configuration information and the second configuration information may each include a common software images, such as hypervisor images, operating system images, etc. In some examples, the method 500 may further include configuring the computing node for operation according to the configuration information.

Figure 6:
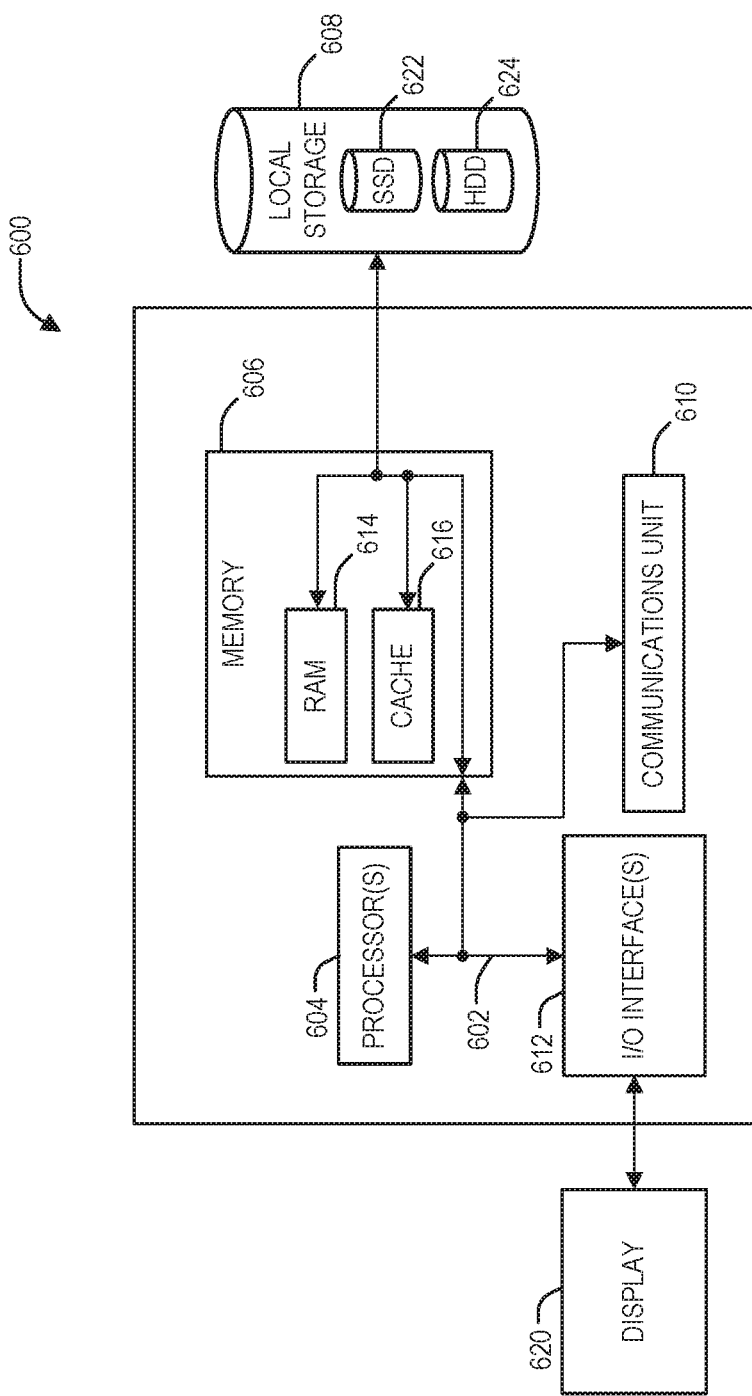
FIG. 6 depicts a block diagram of components of a computing node in accordance with an embodiment of the present disclosure.

FIG. 6 depicts a block diagram of components of a computing node 600 in accordance with an embodiment of the present disclosure. It should be appreciated that FIG. 6 provides only an illustration of one implementation and does not imply any limitations with regard to the environments in which different embodiments may be implemented. Many modifications to the depicted environment may be made. The computing node 600 may implemented as either of the computing nodes 112 or 114 of FIG. 1, any of the computing nodes 204(1)-(N) of FIGS. 2 and 3, and/or the computing node/initialization application 404 of FIG. 4. The computing node 600 may be configured to implement the method 500 of FIG. 5 initialize the computing node 600.

The computing node 600 includes a communications fabric 602, which provides communications between one or more processor(s) 604, memory 606, local storage 608, communications unit 610, I/O interface(s) 612. The communications fabric 602 can be implemented with any architecture designed for passing data and/or control information between processors (such as microprocessors, communications and network processors, etc.), system memory, peripheral devices, and any other hardware components within a system. For example, the communications fabric 602 can be implemented with one or more buses.

The memory 606 and the local storage 608 are computer-readable storage media. In this embodiment, the memory 606 includes random access memory RAM 614 and cache 616. In general, the memory 606 can include any suitable volatile or non-volatile computer-readable storage media.

The local storage 608 may be implemented as described above with respect to local storage 206(1)-(N) of FIGS. 2 and 3. In this embodiment, the local storage 608 includes an SSD 622 and an HDD 624, which may be implemented as described above with respect to SSDs 240(1)-(N) and HDDs 242(1)-(N), respectively.

Various computer instructions, programs, files, images, etc. may be stored in local storage 608 for execution by one or more of the respective processor(s) 604 via one or more memories of memory 606. In some examples, local storage 608 includes a magnetic HDD 624. Alternatively, or in addition to a magnetic hard disk drive, local storage 608 can include the SSD 622, a semiconductor storage device, a read-only memory (ROM), an erasable programmable read-only memory (EPROM), a flash memory, or any other computer-readable storage media that is capable of storing program instructions or digital information.

The media used by local storage 608 may also be removable. For example, a removable hard drive may be used for local storage 608. Other examples include optical and magnetic disks, thumb drives, and smart cards that are inserted into a drive for transfer onto another computer-readable storage medium that is also part of local storage 608.

Communications unit 610, in these examples, provides for communications with other data processing systems or devices. In these examples, communications unit 610 includes one or more network interface cards. Communications unit 610 may provide communications through the use of either or both physical and wireless communications links.

I/O interface(s) 612 allows for input and output of data with other devices that may be connected to computing node 600. For example, I/O interface(s) 612 may provide a connection to external device(s) 618 such as a keyboard, a keypad, a touch screen, and/or some other suitable input device. External device(s) 618 can also include portable computer-readable storage media such as, for example, thumb drives, portable optical or magnetic disks, and memory cards. Software and data used to practice embodiments of the present disclosure can be stored on such portable computer-readable storage media and can be loaded onto local storage 608 via I/O interface(s) 612. I/O interface(s) 612 also connect to a display 620.

Display 620 provides a mechanism to display data to a user and may be, for example, a computer monitor.

What is claimed is:

1. At least one non-transitory computer-readable storage medium including instructions that when executed by a computing node in a computing system, cause the computing node to:
   send a request for a particular network resource from a network management server, wherein the request includes a vendor class identifier that identifies a device class of the computing node;
   receive, from the network management server, an acknowledgement that includes the particular network resource and an encryption key corresponding to the computing node based on the vendor class identifier;
   send, to the configuration management server using the particular network resource, a registration request message encrypted based on the encryption key; and
   receive configuration information corresponding to the computing node from the configuration management server in response to the registration request.

2. The at least one non-transitory computer-readable storage medium of claim 1, wherein the instructions, when executed, further cause the computing node to receive the configuration information corresponding to the computing node based on a request for configuration information provided to the configuration management server.

3. The at least one non-transitory computer-readable storage medium of claim 1, wherein the instructions, when executed, further cause the computing node to send a Dynamic Host Configuration Protocol (DHCP) request message to the network management server to request the particular network resource.

4. The at least one non-transitory computer-readable storage medium of claim 1, wherein the instructions, when executed, further cause the computing node to retrieve the encryption key from a vendor encapsulated option field of a dynamic host configuration protocol (DHCP) acknowledgment message.

5. The at least one non-transitory computer-readable storage medium of claim 4, wherein the instructions, when executed, further cause the computing node to retrieve an internet protocol (IP) address of the configuration management server from a second vendor encapsulated option field of the DHCP acknowledgment message.

6. The at least one non-transitory computer-readable storage medium of claim 1, wherein the instructions, when executed, further cause the computing node to make an encrypted application programming interface (API) call to send the registration request message, wherein the encrypted API call is encrypted based on an API encryption key included in the encryption key.

7. The at least one non-transitory computer-readable storage medium of claim 6, wherein the instructions, when executed, further cause the computing node to receive the API encryption key corresponding to the computing node.

8. The at least one non-transitory computer-readable storage medium of claim 1, wherein the instructions, when executed, further cause the computing node to request the particular network resource from the network management server in response to receipt of an offer message from the network management server that included the particular network resource.

9. The at least one non-transitory computer-readable storage medium of claim 8, wherein the instructions, when executed, further cause the computing node to, prior to receipt of the offer message, broadcast, from the computing node, a discovery message that includes an identifier associated with the computing node to request a network resource.

10. The at least one non-transitory computer-readable storage medium of claim 1, wherein the instructions, when executed, further cause the computing node to configure for operation according to the configuration information.

11. A method comprising:
 requesting, by a computing node, a particular network resource from a network management server;
 receiving acknowledgement of the particular network resource and an encryption key corresponding to a vendor class identifier that identifies a device class of the computing node from the network management server;
 sending, using the particular network resource, a registration request message encrypted based on the encryption key to a configuration management server; and
 receiving configuration information corresponding to the computing node from the configuration management server in response to authentication of the computing node by the configuration management server using the registration request message encrypted based on the encryption key.

12. The method of claim 11, further comprising receiving the configuration information corresponding to the computing node based on a request for configuration information provided to the configuration management server.

13. The method of claim 11, further comprising sending a Dynamic Host Configuration Protocol (DHCP) request message to the network management server to request the particular network resource.

14. The method of claim 11, further comprising receiving the encryption key based on a vendor class identifier provided by the computing node.

15. The method of claim 11, further comprising retrieving the encryption key from a vendor encapsulated option field of a Dynamic Host Configuration Protocol (DHCP) acknowledgment message.

16. The method of claim 15, further comprising retrieving an internet protocol (IP) address for the configuration management server from a second vendor encapsulated option field of the DHCP acknowledgment message.

17. The method of claim 11, further comprising making an encrypted application programming interface (API) call to send the registration request message, wherein the encrypted API call is encrypted based on an API encryption key corresponding the computing node included in the encryption key.

18. The method of claim 17, further comprising receiving the API encryption key corresponding to the computing node.

19. At least one non-transitory computer-readable storage medium including instructions that when executed by a computing node in a computing system, cause the computing node to:
 send a request for a particular network resource to a network management server;
 receive acknowledgement of the particular network resource and an encryption key corresponding to a vendor class identifier that identifies a device class of the computing node from the network management server;
 send, to a configuration management server using the particular network resource, a registration request message encrypted based on the encryption key; and
 receive configuration information corresponding to the computing node from the configuration management server in response to authentication of the computing node by the configuration management server using the registration request message encrypted based on the encryption key.

20. The at least one non-transitory computer-readable storage medium of claim 19, wherein the instructions, when executed, further cause the computing node to encrypt the registration request via an application programming interface (API) encryption key specific to the computing node as the encryption key.

21. The at least one non-transitory computer-readable storage medium of claim 20, wherein the instructions, when executed, further cause the computing node to receive the API encryption key specific to the computing node.

22. The at least one non-transitory computer-readable storage medium of claim 21, wherein the instructions, when executed, further cause the computing node to retrieve the API encryption key from a vendor encapsulated option field of a dynamic host configuration protocol (DHCP) acknowledgment message.

23. The at least one non-transitory computer-readable storage medium of claim 19, wherein the instructions, when executed, further cause the computing node to receive the configuration information corresponding to the computing node based on a request for configuration information provided to the configuration management server.

\* \* \* \* \*